United States Patent
Geiger et al.

(10) Patent No.: US 10,288,279 B2
(45) Date of Patent: May 14, 2019

(54) FLUE GAS HEAT RECOVERY INTEGRATION

(71) Applicant: ALSTOM Technology Ltd, Baden (CH)

(72) Inventors: Frederic Geiger, Giromagny (FR); Haider Mirza, Stuttgart (DE); Damien Baumann, Valdoie (FR)

(73) Assignee: Alstom Technology Ltd, Baden (CH)

( * ) Notice: Subject to any disclaimer, the term of this patent is extended or adjusted under 35 U.S.C. 154(b) by 28 days.

(21) Appl. No.: 15/070,593

(22) Filed: Mar. 15, 2016

(65) Prior Publication Data

US 2016/0195262 A1 Jul. 7, 2016

Related U.S. Application Data

(63) Continuation of application No. PCT/EP2014/068073, filed on Aug. 26, 2014.

(30) Foreign Application Priority Data

Sep. 19, 2013 (EP) ..................................... 13185151

(51) Int. Cl.
*F22D 1/38* (2006.01)
*F24H 8/00* (2006.01)
(Continued)

(52) U.S. Cl.
CPC ............... *F22D 1/38* (2013.01); *F22D 1/003* (2013.01); *F22D 1/36* (2013.01); *F24H 8/006* (2013.01); *Y02B 30/106* (2013.01)

(58) Field of Classification Search
CPC .......... F22D 1/003; F22D 1/36; Y02B 30/106; F24H 8/006
See application file for complete search history.

(56) References Cited

U.S. PATENT DOCUMENTS 5,293,841 A * 3/1994 Suhr .................. F22D 1/36
122/1 A
5,560,209 A * 10/1996 Kienbock ................ F22D 1/36
122/1 R
(Continued)

FOREIGN PATENT DOCUMENTS

CN 102454980 A * 5/2012
CN 102607011 A 7/2012
(Continued)

OTHER PUBLICATIONS

Machine Translation and First Office Action and Search issued in connection with corresponding CN Application No. 201480051658.3 dated Mar. 31, 2017.
(Continued)

*Primary Examiner* — Steven B McAllister
*Assistant Examiner* — Steven S Anderson, II
(74) *Attorney, Agent, or Firm* — Cynthia W. Flanigan; GPO Global Patent Operation

(57) ABSTRACT

A power plant with a fossil fuel fired boiler, an air feed system, flue gas system and condensate system. A unitary flue gas heat exchanger spans a bypass line in the flue gas system and the condensate system so as to improve the thermal efficiency of the power plant while minimising complexity.

5 Claims, 3 Drawing Sheets

(51) Int. Cl.
*F22D 1/36* (2006.01)
*F22D 1/00* (2006.01)

(56) References Cited

U.S. PATENT DOCUMENTS

| | | | |
|---|---|---|---|
| 5,697,210 A | 12/1997 | Kawauchi | |
| 7,021,248 B2 * | 4/2006 | McNertney, Jr. | F22B 37/008 122/4 D |
| 2006/0144043 A1 * | 7/2006 | Takeuchi | F22D 1/36 60/597 |
| 2008/0142608 A1 * | 6/2008 | Krogmann | F23L 15/04 237/12.1 |
| 2010/0212610 A1 * | 8/2010 | Harrison | F22D 1/36 122/421 |
| 2012/0125240 A1 | 5/2012 | Handagama et al. | |
| 2012/0160142 A1 | 6/2012 | Greenhut et al. | |

FOREIGN PATENT DOCUMENTS

| | | | | |
|---|---|---|---|---|
| CN | 202432505 U | | 9/2012 | |
| CN | 103062754 A | | 4/2013 | |
| CN | 203131797 U | | 8/2013 | |
| DE | 2243380 A1 | * | 3/1974 | ............... F22D 1/36 |
| DE | 43 42 156 C1 | | 4/1995 | |
| EP | 2 351 914 A1 | | 8/2011 | |
| EP | 2 388 455 A1 | | 11/2011 | |
| FR | 958440 A | * | 3/1950 | ........... B01D 1/0094 |
| RU | 2345825 C2 | | 2/2009 | |
| WO | 2010/136795 A2 | | 12/2010 | |

OTHER PUBLICATIONS

Xueyi, W., "Industrial Steam Turbine Technology," China Petrochemical Press, pp. 172-173 (Sep. 2010).

Decision to Grant issued in connection with corresponding RU Application No. 2016114849 dated Jun. 1, 2018.

Machine translation and Third Office Action issued in connection with corresponding CN Application No. 201480051658.3 dated Jun. 29, 2018.

* cited by examiner

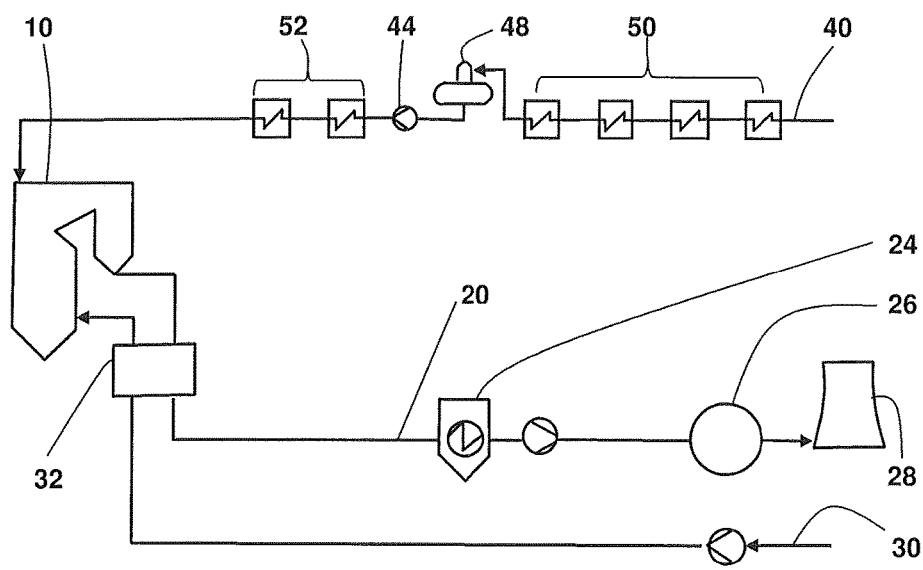
Prior Art    FIG. 1
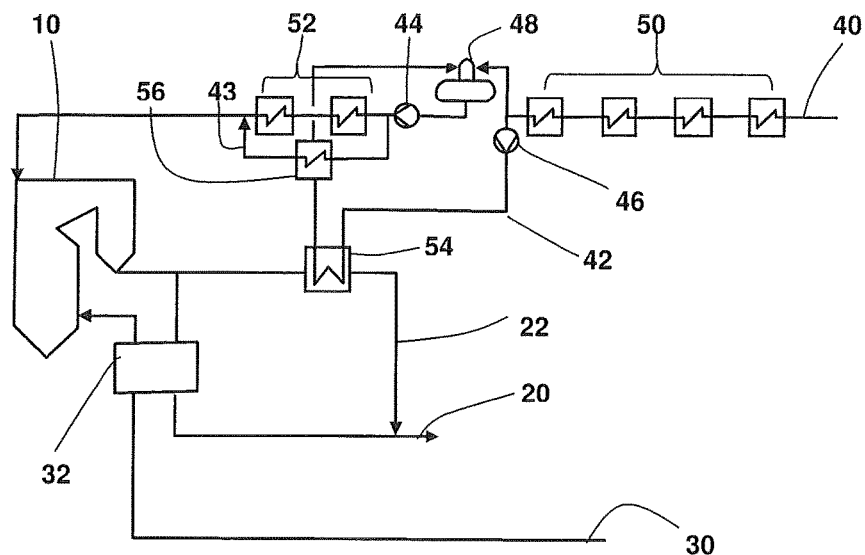
FIG. 2

FLUE GAS HEAT RECOVERY INTEGRATION

CROSS-REFERENCE TO RELATED APPLICATIONS

This application claims priority to PCT Application No. PCT/EP2014/068073 filed Aug. 26, 2014, which claims priority to EP Application No. 13185151.1 filed Sep. 19, 2013, both of which are hereby incorporated in their entirety.

TECHNICAL FIELD

The present disclosure relates generally to power plants comprising fossil fuelled boilers and in particular to energy efficient configurations thereof.

BACKGROUND

A typical fossil fuel power plant, described for example in EP 2351914 A, has a boiler comprising an economizer, an evaporator, a super heater, and a reheater, as well as several steam turbine modules comprising high-pressure, intermediated-pressure and low-pressure stages mounted on a shaft that drives a generator. Steam generated by the boiler is first expanded in the high-pressure turbine stage after which it is reheated in the reheater before being subsequently fed into the intermediate-pressure turbine stage. Steam exhausted from the intermediate stage, after being further expanded in the low-pressure turbine stage, is fed into a condenser. Condensate collected in the well of the, condenser is pumped by one or more extraction pumps to condensate preheaters that preheat the condensate using steam extracted from the low- and intermediate-pressure steam turbines. The plant may further comprise one or more high pressure preheaters located downstream of a feed water pump system used to boost the pressure of the condensate downstream of the low-pressure preheaters. Steam extracted from the high pressure turbine stage may be used as a heat source for these preheaters. Preheated condensate from the high pressure preheaters is then feed into the boiler/ economiser thus completing a closed loop steam condensate cycle.

A typical fossil fuel power plant includes a fossil fuel system, which may comprise a coal milling facility that feeds the coal into the boiler, an air system for supplying combustion air, and a flue gas exhaust system for directing flue gas from the boiler. The flue gas system typically includes an air preheater for preheating air before it enters the boiler and a particulate collection system, such as an electrostatic precipitator or fabric filter and a desulphurization unit that polishes the flue gas before it is emitted through a stack or cooling tower. Preheating of air using flue gas is one means of improving the thermal efficiency of the plant. There is, however, a constant need to provide plants that balance increasing thermal efficiency demands at reduced cost which may be achieve through reduced complexity.

SUMMARY

A fossil fuel power plant arrangement is provided that addresses the dual problem of plant complexity and thermal efficiency.

This problem is addressed by means of the subject matter of the independent claim. Advantageous embodiments are given in the dependent claims.

The disclosure is based on the general idea of providing a unitary flue gas heat exchanger that spans the bypass line and the second condensate line and is configured and arranged to transfer thermal energy from flue gas to condensate.

An aspect provides a power plant that has a fossil fuel fired boiler, an air feed line for feeding air into the boiler, a flue gas line connected to the boiler for exhausting flue gas from the boiler, an air preheater configured and arranged in both the air feed line and the flue gas line to exchange thermal energy from flue gas exiting the boiler to air feed into the boiler. The aspect further provides a bypass line that forms part of the flue gas line and is arranged to bypass the air preheater, a first condensate line, connected to the boiler for feeding condensate into the boiler, with a plurality of preheaters, and a second condensate line with first and second distal ends connected to the first condensate line. The aspect further includes a unitary flue gas heat exchanger, spanning the bypass line and the second condensate line. The unitary flue gas heat exchanger provides an efficient yet simple means of transferring thermal energy from the flue gas to the condensate in the condensate lines.

In an aspect, the condensate line comprises one or more low pressure preheaters, one or more high pressure preheater and a feed water pump system that is fluidly located between the one or low pressure preheaters and the one or more high pressure preheaters. The feed water pump system is configured and arranged to boost condensate pressure in the first condensate line. A first end of the second condensate line is located downstream of the low pressure heater and upstream of the feed water pump system and an auxiliary feed water pump system is located in the second condensate line.

In different aspects the auxiliary feed water pump system is located either upstream or downstream of the flue gas heat exchanger.

In an aspect, the second end of the second condensate line is located downstream of the one or more high pressure preheaters, while in another aspect the second end of the second condensate line is located upstream of the feed water pump system.

In an aspect, the second condensate line between the flue gas heat exchanger and the second end passes through at least one of the one or more high pressure preheaters on the steam side so as to enable heating of condensate passing through the at least one or more high pressure preheaters.

A further aspect includes a third condensate line with a first end located fluidly between the feed water pump system and the one or more high pressure preheaters and a second end located in the first condensate line downstream of the one or more high pressure preheaters . The aspect also includes a condensate heat exchanger in the third condensate line. In this aspect, the second end of the second condensate line is located fluidly between the one more low pressure preheaters and the feed water pump system while a portion of the second condensate line, located downstream of the flue gas heat exchanger, passes through the condensate heat exchanger thereby enabling condensate passing through the third condensate line to be heated by condensate heated within the flue gas heat exchanger.

In an aspect, the condensate line comprises one or more low pressure preheaters, one or more high pressure preheaters and a feed water pump system that is fluidly located between the one or more low pressure preheaters and the one or more high pressure preheaters and further configured and arranged to boost condensate pressure in the first condensate line. The first end of the second condensate line is located fluidly between the feed water pump system and the one or more high pressure preheaters and the second end of the second condensate line is located downstream of the one or more high pressure preheaters.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which:

FIG. 1 is a schematic of a prior art steam plant arrangement;

FIG. 2 is a schematic of an exemplary embodiment of a steam plant having an intermediate hot/warm condensate heat exchanger;

DETAILED DESCRIPTION

Figure 3:
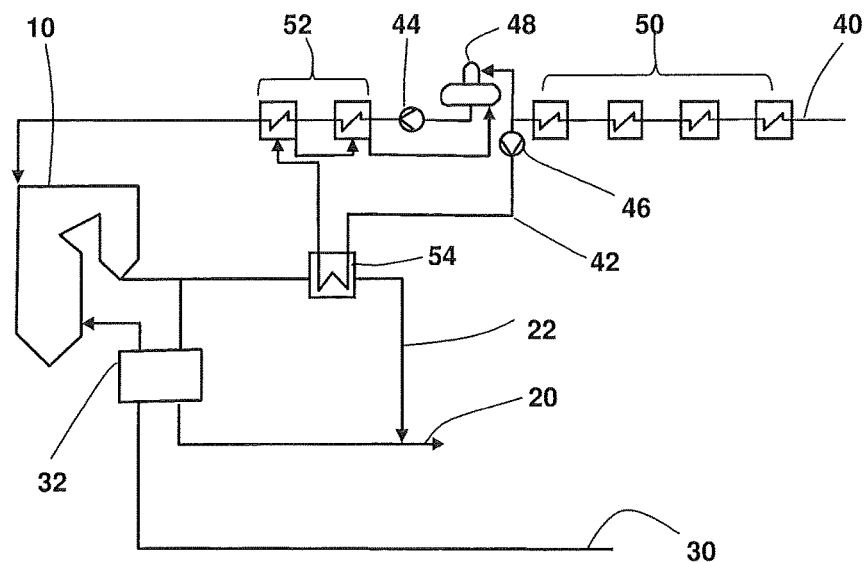
FIG. 3 is a schematic of a further exemplary embodiment having a unitary flue gas/condensate heat exchanger combined with a cascade of condensate preheaters.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

Exemplary embodiments herein described may be applied to a fossil fuel fired power plant as shown in FIG. 1. Such a fossil fuel power plant comprises, a boiler 10, an air line 30 for feeding mainly combustion air into the boiler 10, a flue gas line 20 for exhausting flue gas from the boiler 10, and a condensate line 40 that forms parts of a closed loop water/steam circuit for feeding condensate into the boiler 10.

Typically, an air preheater 32 spans the flue gas line 20 and the air line 30. The flue gas line 20 may further include a particulates collection unit 24, for example an electrostatic precipitator and a desulphurisation unit 26 connection prior to an exhaust stack 28 or cooling tower 28.

The condensate line 40 includes a plurality of preheaters 50, 52 that may include one or more low pressure preheaters 50 and one or more high pressure preheaters 52. In such an arrangement, a feed water pump system 44, located between the low pressure preheaters 50 and the high pressure preheaters 52 boosts the pressure of condensate passing through the condensate line 40. An optional low pressure feed water tank 48, forming part of the condensate line 40, may be located between the feed water pump system 44 and the one or more low pressure preheaters 50.

In an exemplary embodiment shown in FIG. 2, the flue gas system of the power plant has a bypass line 22 around the air preheater 32 that acts as a means to enable as least some flue gas from the boiler to bypass the air preheater 32 partially located in the flue gas line 20. In addition, the condensate system includes a second condensate line 42 that extends from the condensate line 40 between the one or more low pressure preheaters 50 and the feed water pump system 44, through an auxiliary feed water pump system 46 and a flue gas heat exchanger 54 located on the bypass line 22 and then through a condensate heat exchanger 56 before returning back to the same region of the condensate line 40, either directly to the line portion or else to a low pressure feed water tank 48 that forms part of the condensate line 40.

The flue gas heat exchanger 54, which is a unitary heat exchanger, that is the only heat exchanger in the bypass line 22, enables the transfer of thermal energy from the flue gas system into the condensate system.

A third condensate line 43 has ends joining the condensate line 40 at a point between the one or more high pressure preheaters 52 and the feed water pump system 44 and at a point between the boiler 10 and the one or more high pressure preheaters 52. The third condensate line 43 further passes through the condensate heat exchanger 56. The second condensate line 42 and the third condensate line 43 to the condensate are thermally connected via heat exchanger 54.

In an exemplary embodiment shown in FIG. 3, the flue gas system of the power plant has a bypass line 22 around the air preheater 32 that acts as a means to enable as least some flue gas from the boiler to bypass an air preheater 32 that is partially located in the flue gas line 20 and the air line 30. The condensate system additionally includes a second condensate line 42 that extends from the condensate line 40 between the one or more low pressure preheaters 50 and the feed water pump system 44, through and auxiliary feed water pump system, a flue gas heat exchanger 54 located on the bypass line 22 and then through the one or more high pressure preheaters 52 before returning back to the same region of the condensate line 40, either directly to the line or via a low pressure feed water tank 48.

The flue gas heat exchanger 54, which is a unitary heat exchanger, that is the only heat exchanger on the bypass line, enables the transfer of thermal energy from the flue gas into the condensate system. The further connection of the second condensate line 42 to the one or more high pressure preheaters 52 enables the transfer of thermal energy gained by condensate in the flue gas heat exchanger 54 into the main condensate flow passing through the one or more high pressure preheaters 52.

Figure 4:
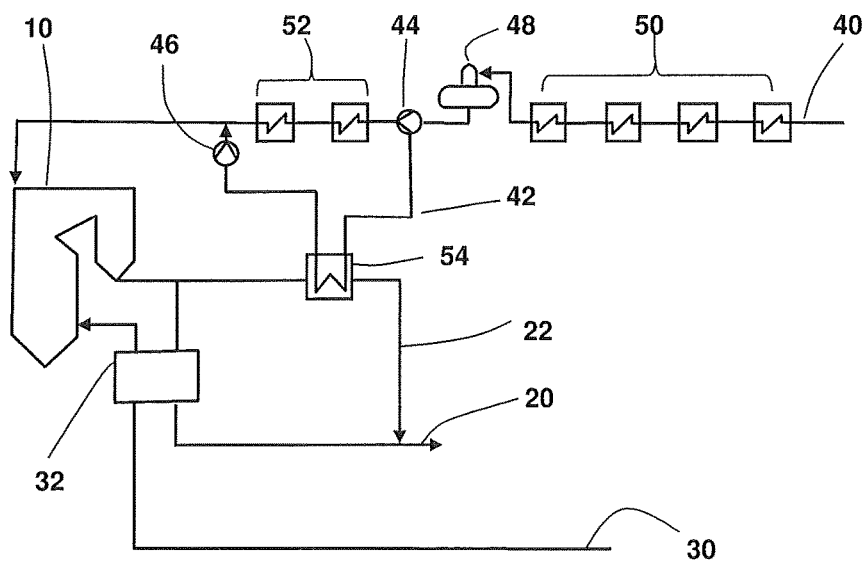
FIG. 4 is a schematic of a further exemplary embodiment having a unitary flue gas/condensate heat exchanger combined from a low pressure feed water tank and an auxiliary feed water pump system.

In an exemplary embodiment shown in FIG. 4, the flue gas system of the power plant has a bypass line 22 around the air preheater 32 that acts as a means to enable at least some flue gas from the boiler 10 to bypass an air preheater 32 that is partially located in the flue gas line 20 and the air line 30. In addition, the condensate system includes a second condensate line 42 that extends from the feed water pump system 44, through a flue gas heat exchanger 54 located on the bypass line 22, and then through an auxiliary feed water pump system 46, before returning back to a region of the condensate line 40 between the boiler 10 and the one or more high pressure preheaters 52.

The flue gas heat exchanger 54, which is a unitary heat exchanger, that is the only heat exchanger in the bypass line 22, enables the transfer of thermal energy from the flue gas into the condensate system.

Figure 5:
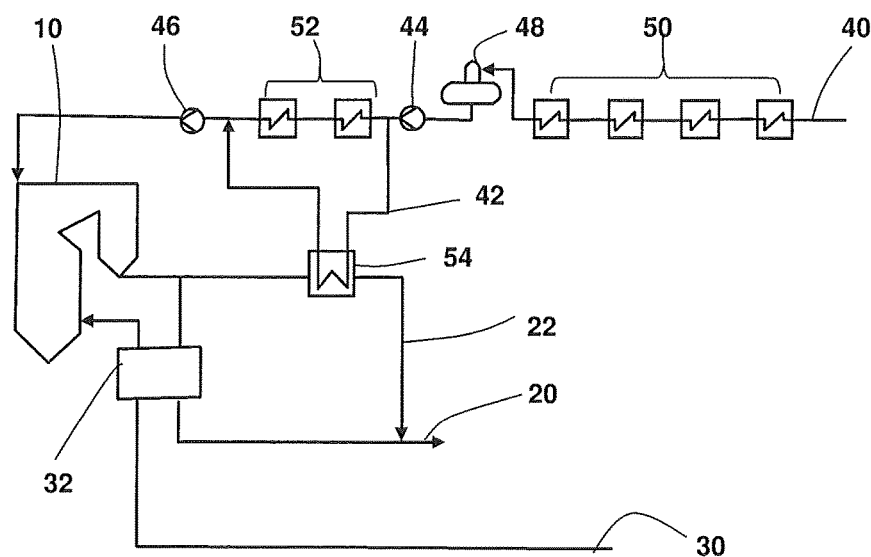
FIG. 5 is a schematic of a further exemplary embodiment having a unitary flue gas/condensate heat exchanger combined from a low pressure feed water tank to boiler inlet with an auxiliary feed water pump system.

In an exemplary embodiment shown in FIG. 5, the flue gas system of the power plant has a bypass line 22 around the air preheater 32 that acts as a means to enable at least some flue gas from the boiler to bypass an air preheater 32 that is partially located in the flue gas line 20 and the air line 30. In addition, the condensate system includes a second condensate line 42 that extends from the condensate line 40 between the one or more high pressure preheaters 52 and the feed water pump system 44, through a flue gas heat exchanger 54 located on the bypass line 22, and then through an auxiliary feed water pump system 46, before returning back to a region of the condensate line 40 between the auxiliary feed water pump system 46 located in the condensate line 40 downstream of the one or more high pressure preheaters 52 and the one or more high pressure preheaters 52.

The flue gas heat exchanger 54, which is a unitary heat exchanger, that is the only heat exchanger in the bypass line 22, enables the transfer of thermal energy from the flue gas into the condensate system.

Figure 6:
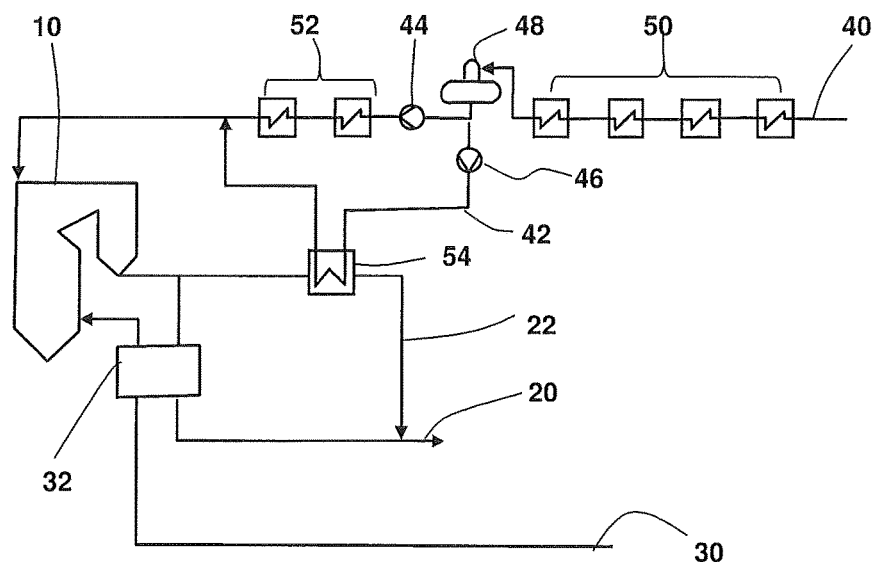
FIG. 6 is a schematic of a further exemplary embodiment having a unitary flue gas/condensate heat exchanger combined from a low pressure feed water tank to boiler inlet with a dedicated feed water pump system.

In an exemplary embodiment shown in FIG. 6, the flue gas system of the power plant has a bypass line 22 around the air preheater 32 that acts as a means to enable at least some flue gas from the boiler 10 to bypass an air preheater 32 that is partially located in the flue gas line 20 and the air line 30. In addition, the condensate system includes a second condensate line 42 that extends from the condensate line 40 between the one or more high pressure preheaters 52 and the feed water pump system 44, through an auxiliary feed water pump system 46 and then through a flue gas heat exchanger 54 located on the bypass line 22, before returning back to a region of the condensate line 40 between the boiler 10 and the one or more high pressure preheaters 52.

The flue gas heat exchanger 54, which is a unitary heat exchanger, that is the only heat exchanger in the bypass line 22, enables the transfer of thermal energy from the flue gas into the condensate system.

In an alternate not shown exemplary embodiment, the auxiliary feed water pump system 46 is located downstream of the flue gas heat exchanger 54 instead of upstream of the flue gas heater exchanger 54 as shown in FIG. 6.

Although the disclosure has been herein shown and described in what is conceived to be the most practical exemplary embodiment, it will be appreciated that the present disclosure can be embodied in other specific. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A power plant comprising:
   a fossil fuel fired boiler;
   an air feed line to feed air into the boiler;
   a flue gas line connected to the boiler to exhaust flue gas from the boiler;
   an air preheater in both the air feed line and the flue gas line to exchange thermal energy from flue gas exiting the boiler to air fed into the boiler;
   a bypass line forming part of the flue gas line arranged to bypass the air preheater;
   a first condensate line connected to the boiler to feed condensate into the boiler having one or more low pressure preheaters, one or more high pressure preheaters, and a feed water pump fluidly located between the one or more low pressure preheaters and the one or more high pressure preheaters to boost condensate pressure in the first condensate line,
   a second condensate line with first and second distal ends connected to the first condensate line, wherein a first end of the second condensate line is located downstream of the one or more low pressure preheaters and upstream of the feed water pump and an auxiliary feed water pump is located in the second condensate line;
   a flue gas heat exchanger spanning the bypass line and the second condensate line to transfer thermal energy from flue gas to condensate;
   a third condensate line with a first end located fluidly between the feed water pump and the one or more high pressure preheaters, and a second end located in the first condensate line downstream of the one or more high pressure preheaters; and
   a condensate heat exchanger in the third condensate line, wherein the second end of the second condensate line is located fluidly between the one more low pressure preheaters and the feed water pump, and a portion of the second condensate line located downstream of the flue gas heat exchanger passes through the condensate heat exchanger to enable condensate passing through the third condensate line to be heated by condensate heated within the flue gas heat exchanger.

2. The power plant of claim 1 wherein the second condensate line extends from the feedwater pump.

3. The power plant of claim 1 wherein the auxiliary feed water pump is located upstream of the flue gas heat exchanger.

4. The power plant of claims 1 wherein the second end of the second condensate line is located upstream of the feed water pump.

5. The power plant of claim 1 wherein the second condensate line between the flue gas heat exchanger and the second end passes through at least one of the one or more high pressure preheaters so as to enable heating of condensate passing through the at least one or more high pressure preheaters.

* * * * *